(12) United States Patent
Chen

(10) Patent No.: US 7,000,006 B1
(45) Date of Patent: Feb. 14, 2006

(54) IMPLEMENTING NETWORK MANAGEMENT POLICIES USING TOPOLOGY REDUCTION

(75) Inventor: Shigang Chen, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 09/872,056

(22) Filed: May 31, 2001

(51) Int. Cl.
*G06F 15/16* (2006.01)

(52) U.S. Cl. .................... 709/218; 709/228; 709/239; 370/252; 370/389; 713/201

(58) Field of Classification Search ............... 709/224, 709/226, 238, 227, 223, 225, 228, 218, 239; 370/254, 256, 229, 257, 445, 252, 389; 707/10; 713/201
See application file for complete search history.

(56) References Cited

U.S. PATENT DOCUMENTS

| | | | | |
|---|---|---|---|---|
| 5,825,772 | A * | 10/1998 | Dobbins et al. | 370/396 |
| 6,115,753 | A * | 9/2000 | Joens | 709/242 |
| 6,167,444 | A * | 12/2000 | Boden et al. | 709/223 |
| 6,185,619 | B1 * | 2/2001 | Joffe et al. | 709/229 |
| 6,246,689 | B1 * | 6/2001 | Shavitt | 370/406 |
| 6,286,038 | B1 * | 9/2001 | Reichmeyer et al. | 709/220 |
| 6,298,044 | B1 * | 10/2001 | Britt | 370/252 |
| 6,412,000 | B1 * | 6/2002 | Riddle et al. | 709/224 |
| 6,502,131 | B1 * | 12/2002 | Vaid et al. | 709/224 |
| 6,633,915 | B1 * | 10/2003 | Hashimoto | 709/228 |
| 6,646,989 | B1 * | 11/2003 | Khotimsky et al. | 370/238 |
| 6,697,338 | B1 * | 2/2004 | Breitbart et al. | 370/254 |
| 6,760,775 | B1 * | 7/2004 | Anerousis et al. | 709/238 |
| 6,909,709 | B2 * | 6/2005 | Mesiwala | 370/352 |
| 2002/0062359 | A1 * | 5/2002 | Klopp et al. | 709/219 |
| 2005/0105524 | A1 * | 5/2005 | Stevens et al. | 370/389 |

OTHER PUBLICATIONS

K. Lougheed, et al., "A Border Gateway Protocol (BGP)", Network Working Group Request for Comments: 1105, Jun. 1989, pp. 1-5.
K. Lougheed, et al., "A Border Gateway Protocol (BGP)", Network Working Group Request for Comments: 1163, Jun. 1990, pp. 1-28.
K. Lougheed, et al., "A Border Gateway Protocol 3 (BGP-3)", Network Working Group Request for Comments: 1267, Oct. 1991, pp. 1-33.
Y. Rekhter, et al., "Application of the Border Gateway Protocol in the Internet", Network Working Group Request for Comments: 1268, Oct. 1991, pp. 1-13.

(Continued)

*Primary Examiner*—Khanh Quang Dinh
(74) *Attorney, Agent, or Firm*—Hickman Palermo Truong & Becker, LLP

(57) ABSTRACT

A method and apparatus for implementing network management policies is provided. A communication path is determined that passes through a domain of a network. The communication path characterizes the first domain as a node, but does not lose information. A management policy is then implemented using the communication path. Another aspect of the invention provides a method implementing a management policy using topology reduction. A network is abstracted into domains, and each domain may be cloudified if that domain is determined to have a cloudification characteristic. Domains that are cloudified are subsequently represented as having reduced topology and internal connectivity, but this representation does not incur information loss when management policies are implemented using the cloudified domains. In other aspects, the invention provides a computer-readable medium and system configured to carry out the foregoing.

17 Claims, 4 Drawing Sheets

OTHER PUBLICATIONS

S. Willis, et al., "Definitions of Managed Objects for the Border Gateway Protocol (Version 3)", Network Working Group Request for Comments: 1269, Oct. 1991, pp. 1-8.

Y. Rekhter, et al., "Application of the Border Gateway Protocol in the Internet", Network Working Group Request for Comments: 1655, Jul. 1994, pp. 1-12.

Y. Rekhter, et al., "Application of the Border Gateway Protocol in the Internet", Network Working Group Request for Comments: 1772, Mar. 1995, pp. 1-18.

J. Moy, "OSPF protocol analysis", Network Working Group Request for Comments: 1245, Jul. 1991, pp. 1-12.

J. Moy, "Experience with the OSPF protocol", Network Working Group Request for Comments: 1246, Jul. 1991, pp. 1-29.

J. Moy, "OSPF Version 2", Network Working Group Request for Comments: 1247, Jul. 1991, pp. 1-17.

G. Malkin, "RIP Version 2 Protocol Analysis", Network Working Group Request for Comments: 1387, Jan. 1993, pp. 1-3.

G. Malkin, "RIP Version 2 Protocol Analysis", Network Working Group Request for Comments: 1721, Nov. 1994, pp. 1-4.

* cited by examiner

IMPLEMENTING NETWORK MANAGEMENT POLICIES USING TOPOLOGY REDUCTION

FIELD OF THE INVENTION

The present invention relates to the field of computer network management. In particular, embodiments of the invention pertain to methods of implementing network management policies using topology reduction.

BACKGROUND OF THE INVENTION

For policy based network management, users typically specify high-level end-to-end management policies that are implemented on a network through intensive computations. As an example, security policies manage firewalls to specify which traffic streams should be allowed and which traffic streams should be excluded from the network. All possible routing paths must be computed in order for the security policy to be implemented on the appropriate firewalls. This includes identifying the firewalls for all of the communication paths, and providing the appropriate device commands for the firewalls to enforce the security policy.

The computation required to implement such a security policy is intensive, and directly related to the size and complexity of the network topology. For example, some network topologies incorporate commercial software such as CiscoSecure Policy Manager from Cisco Systems Inc. to implement security policies. To configure a security policy in the network topology for a source and a destination, all possible communication paths between the source and the destination must be identified and considered in configuring the security policy. In some cases, each network element subject to the security policy is accounted for in a manner such that the computational processing and complexity is N factorial, where N is the number of network elements. As a result, configuring security policies for a network may require several days of computations by a high-level server.

In addition, the overwhelming details of the entire network may make it difficult to analyze or even view.

Based on the foregoing, there is a clear need in the field for a way to reduce the amount of processing time involved in configuring networks for policy management. There is a specific need for a way to reduce the number of nodes in a representation of network topology for purpose of policy management.

SUMMARY OF THE INVENTION

An aspect of the invention provides a method implementing a management policy using topology reduction. A network is abstracted into domains, and each domain may be cloudified if that domain is determined to have a cloudification characteristic. Domains that are cloudified are subsequently represented as having reduced topology and internal connectivity, but this representation does not incur information loss when management policies are implemented using the cloudifed domains.

In other aspects, the invention provides a computer-readable medium and system configured to carry out the foregoing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
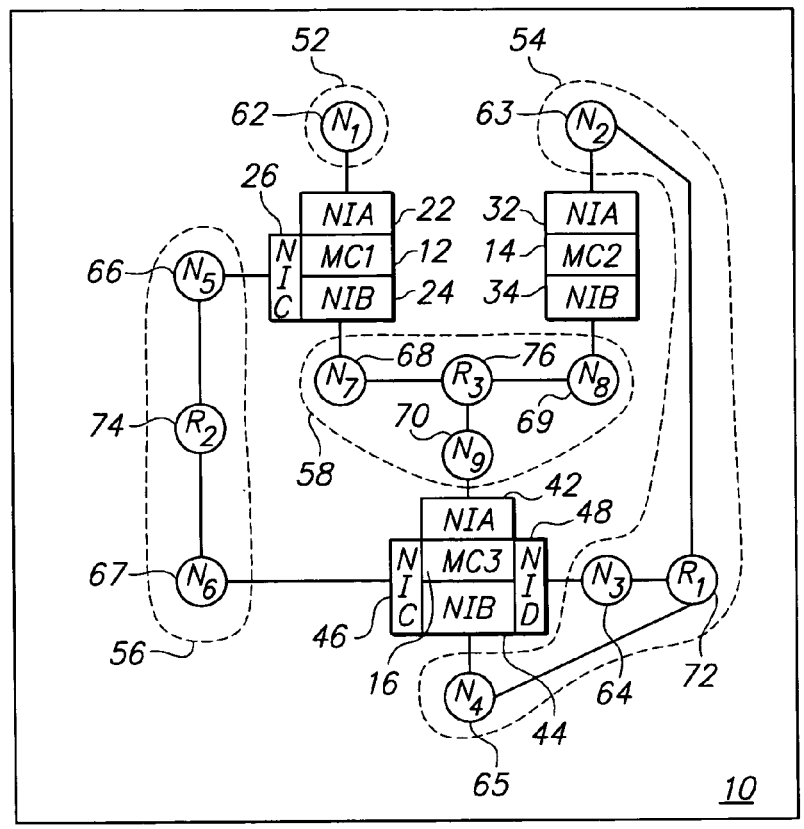
FIG. 1 illustrates a simplified example of a network system having a reduceable topology.

A method and apparatus is provided for implementing network management policies using topology reduction. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Certain embodiments may significantly reduce computational resources required for implementing management policies on networks. The cloudified domains help remove irrelevant, or less-important information from the network topology so that the amount of computation can be reduced, without affecting the computation results. By reducing an effective topology of a network, management policies are easier to implement and analyze for performance. Furthermore, computational overhead and other costs are reduced.

Under one embodiment, internal topology of the network that is irrelevant to the management policy is identified and discarded for computation of the management policy. The result is that the network can be characterized with simplified data representations that describe the communication paths of a network, without incurring any information loss.

An embodiment of the invention provides for implementing management policies on a network. The network may include a plurality of domains, including a first domain having a plurality of network elements. A communication path is determined that passes through the first domain of the network. The first domain can be characterized as a node within the first communication path. Communications can pass through the first domain without information loss. A management policy may be implemented for the network using the communication path.

A management policy is a configuration for network communications that affect network communications passing through management components. In one embodiment, a management policy is used to identify communication packets, analyze metadata information provided with individual communication packets, and make policy decisions for individual communication packets. Examples of policy managements include implementations of firewalls, authentication modules, virtual networks, and quality of service policies.

A management component may be used to implement policies on a selected network. A management component may be in the form of a server, or software or hardware component of a server, that is communicatively coupled to intercept communications directed to and from portions of the network. The management component may interact with other portions of the network through a network interface.

In an embodiment, one or more firewall components are used to implement a firewall policy for portions of the network. A firewall component determines whether to pass communications into a network, or intercepts unwanted or unknown communications from being sent out and/or received by a particular network. In an embodiment, a firewall module performs functions that include inspecting each data packet, including each data packet's source address and destination address. A firewall component implements a decision for treatment of the data packet according to a firewall management policy. For example, firewall management policy dictates whether a firewall component should drop a particular data packet, allow the data packet to pass through, encapsulate the data packet, and/or assign the data packet to a virtual private network or other network communication mechanism.

A domain is a logical portion of a network having one or more network elements. A network element includes connected networks such as Local Area Networks, as well as elements to facilitate communications between network elements, such as routers.

A communication path is a route for traffic between network elements. The communication path passes communications that have source and destination addresses. A communication is said to pass through a domain if the communication's source and destination are outside that domain. A communication originating or terminating within a domain is said to have an end component within a domain.

A domain characterized as a node within a communication path is treated as not having any internal topology for purpose of identifying communication paths. The node may be treated as a logical node. Characterizing the domain as a node can determine the network distance for the portion of the communication path within the domain, by taking into consideration some abstracted information about the domain. Thus, a distance internal to the domain may be treated differently than the internal network topology.

In another embodiment, a plurality of domains are identified within the network. Each of the plurality of domains includes at least one network element. One or more cloudified domains are identified from the plurality of domains. Each cloudified domain is bounded by at least one management component and at least one interface for the management component. A first end point and a second end point are identified for a communication transaction. A plurality of communication paths may be determined for the communication transaction, including a first path that passes within a first cloudified domain in the plurality of domains. The first path characterizes the first cloudified domain as a first distance between an interface to the first domain and one of the first end point or second end point. The first path passes the communication within the first cloudified domain without information loss. A management policy is implemented on the first communication path once the first path is identified.

A cloudified domain or cloud is a collection of connected network elements having an internal connectivity that can be represented by a relationship amongst surrounding network interfaces to managed components, or between surrounding network interfaces and individual network elements internal to that domain. A domain may be cloudified for purpose of identifying communication paths using that domain. The internal topology of cloudified domain is mostly ignored. A cloudified domain containing one of the end points for a communication transaction can be represented as a distance between the end point element and the interfaces to the managed components that bound that domain.

A cloudified domain having no end point elements for a communication path may be represented by surrounding network interfaces to managed components that bound that domain. Such a cloudified domain to a given communication path may alternatively be referred to as a transient cloud.

Another embodiment provides for identifying a plurality of domains in the network, where each of the plurality of domains have at least one network element. One or more cloudified domains are identified from the plurality of domains. Each cloudified domain is bounded by one or more management components and at least one interface for each of the one or more management components. A first data structure is determined for each of the plurality of cloudified domains. The first data structure includes a data element that specifies a distance between each network element in that cloudified domain and the at least one interface for the one or more management component that bound that cloudified domain. A second data structure is determined for each of the cloudified domains. The second data structure includes a data element that specifies a distance between each of the interfaces of the one or more management components that bound the cloudified domain. The first data structure and the second data structure are stored. The data structures can subsequently be retrieved to implement a management policy.

A domain, cloudified domain, network topology, path, policy, network element, distance, interface, and other elements described herein may be represented in the form of one or more data representations, abstract data structures, or other information that is created, stored in a computer-readable medium, and managed by one or more software elements. Such data representations nay be processed by a network management station, policy manager, or other processor to accomplish the methods described herein.

FIG. 1 is a simplified illustration of a network 10 comprising a plurality of managed components, under an embodiment of the invention. A management policy may be implemented on network 10 using one or more managed components. The network 10 includes a reduceable topology for implementing the managed policy on the managed components. In an embodiment shown, network 10 includes a first management component 12, second management component 14 and third management component 16. Examples of management components for use with embodiments of the invention include CiscoSecure Policy Managers. Other examples include firewall devices.

Each management component 12, 14 and 16 includes one or more network interfaces. The network interfaces may be distinguished in types or kind through letters A, B, C and D. The first management component 12 includes interface A 22, interface B 24 and interface C 26. The second management component 14 includes interface A 32, and interface B 34. The third management component 16 includes interface A 42, interface B 44, interface C 46 and interface D 48.

As will be described in greater detail, network 10 can be abstracted into partitions. Each partition may include one or more network elements. The network 10 is shown to be partitioned into a first domain 52, a second domain 54, a third domain 56 and a fourth domain 58. Each domain includes one or more network elements. Further, each domain is bounded by one or more managed components. The managed component that bounds a managed domain includes one or more internal network interfaces to that domain. The network interface is an edge component to that managed domain. In an example shown by FIG. 1, network elements are a combination of networks and routers. First domain 52 includes a first network 62. Second domain 54 includes second network 63, third network 64, and fourth network 65. In addition, second domain 54 includes first router 72. Third domain 56 includes fifth network 66 and sixth network 67. The third domain 56 also includes second router 74. Fourth domain 58 includes seventh network 68, eighth network 69, ninth network 70, and third router 76.

One or more of the domains in network 10 can be cloudified to simplify implementation of the managed policy on network 10. A domain can be cloudified if that domain satisfies one or more cloudification criterias. The cloudification criteria may be specific to the type of managed components or management policy being implemented. When cloudified, communications passing internally in the domain can be represented by simplified data structures. Specifically, the data structures can be used to create simplified characterizations or representations of communications passing through or within the cloudified domains without information loss. This allows the management policy to be implemented on network 10 with less computational resources. In an embodiment, each cloudified domain can be represented by four data structures:

(a) an array of the inside interfaces of all edge management components (labeled as IN_INTFS[ ]);
(b) an array of all internal networks in the managed domain (labeled as NETWORKS[ ]);
(c) an array storing the distance from an internal network to an inside interface (labeled as D[x][intf]); and
(d) an array storing the distance from one inside interface to another inside interface (labeled as DI[intf1][intf2]).

In an embodiment, arrays IN_INTFS and NETWORKS are one-dimensional, and arrays D and DI are two dimensional.

In FIG. 1, second domain 54, third domain 56 and fourth domain 58 satisfy a cloudification criteria. A cloudification criteria is a characteristic of the domain that allows for the domain to be represented as a cloud, without information loss. With network 10 partitioned into domains, some of which are cloudified, management policies can be implemented for communications passed between a source network element and a destination network element. The source and destination network elements may also be referred to as end point elements for a particular communication path.

First domain 52 includes only a singular network element so it is excluded from cloudification. The second domain 54, third domain 56 and fourth domain 58 are assumed to satisfy a cloudification criteria. For second domain 54, data structure IN_INTFS includes interface A 32 for second managed component 14, interface D 48 for third management component 16, and interface B for third management component 16. The data structure NETWORKS includes second network 63, third network 64, and fourth network 65.

For third domain 56, data structure IN_INTFS includes interface C for third management component 16 and interface C 26 for first management component 12. The data structure NETWORKS includes fifth network 66 and sixth network 67.

For fourth domain 58, data structure IN_INTFS includes interface B 24 for first management component 12, interface B 34 for second management component 14 and interface A 42 for third management components. The data structure NETWORKS includes seventh network 68, eighth network 69 and ninth network 70.

Use of data structures D and DI in determining communication paths for implementation of management policies may be illustrated through the following examples. In a first example, a management policy is desired for a communication path between fifth network 66 and third network 64. Thus, the end point elements are fifth network 66 and third network 64. The end point elements are in separate cloudified domains. For a given transaction, fifth network 66 can be assumed to be the source element, and third network 64 can be assumed to be a destination element. However, the communication path assumes two-directional traffic.

An embodiment of the invention calculates all possible paths between the end point elements using the simplified data structures for cloudified domains. For a communication path between fifth network 66 and third network 64, the data structures are used to calculate a distance within each domain of one of the end point elements. One or more of the communication paths may also pass through a cloudified domain. Such domains are transient cloudified domains, and treated as a node.

Using the simplified data structures, a first possible communication path from between fifth network element 66 and third network element 64 includes: fifth network element 66 to interface C 26 and then interface B of first management component 12, through cloudified fourth domain 58, to interface A 42 and then interface D 48 of third management component 16, and to third network 64. A second possible communication path from between fifth network element 66 and third network element 64 includes: fifth network element 66 to interface C and then interface B of first management component 12, through cloudified fourth domain 58, to interface B 34 and interface A 32 of second management component 14, and to third network 64. A third possible communication path from between fifth network element 66 and third network element 64 includes: fifth network element 66 to interface C 46 and then interface D 48 of third management component 16, and to third network element 64.

Once cloudified domains are used to determine the possible communication paths, a criteria may be used to select the optimal or preferred communication path. In an embodiment, the optimal communication path is selected as having the shortest network distance. The shortest communication path requires the fewest network resources, and is therefore the easiest and most efficient to configure for a specific management policy. Alternatively, the communication path may be selected on specific criterias required by management components of network 10. Although determining all communication paths is not a required step for calculating the optimal path, an embodiment provides for an internal topology of a domain to be characterized as a logical node, so that the internal topology of the domain is not factored in management policy computations.

Using the data structures, a network distance of each possible communication path may be determined using the following qualitative expressions:

(a) Length(*path1*)=*cloud3*.D[*N5*][*MC1.C*]+cloud2.DI[*MC1.B*][*MC3.A*]+cloud1.D[*N3*][*MC3.D*]

(b) Length(*path2*)=*cloud3*.D[*N5*][*MC1.C*]+cloud2.DI[*MC1.B*][*MC2.B*]+cloud1.D[*N3*][*MC2.A*]

(c) Length(*path3*)=*cloud3*.D[*N5*][*MC3.C*]+cloud1.D[*N3*][*MC3.D*]

There are many ways to calculate network distances. For illustration, network distances are calculated in terms of Hops, although other timing components may equally be employed (such as network delays in milliseconds). The number of hops of a communication path is defined as the number of networks the path passes. Therefore, each communication between a network element and a router interface is 1 Hop. Every communication passing through one of the routers is 2 Hops. Using this process, Length (path1)=4, Length (path2)=5, and Length (path3)=3. The shortest network distance is therefore the third communication path.

A management policy can be implemented on the third communication path between fifth network 66 and third network 64. The management policy configures network 10 so that only third management component 16 receives communications between fifth network element 66 to third network element 64. The third management component 16 is then configured to implement the management policy for communications between fifth network element 66 and third network element 64.

As shown by the example, an end point element in a cloudified domain is represented by data structures identifying that network element and the interfaces to management components that bind that domain. A cloudified domain that is part of a communication path but excludes the end point elements is treated as a node. The cloudification ignores most, if not all, of the internal topological details about the domains and thus reduces computational resources for identifying possible communication paths between the end point elements. Once the communication paths are identified, network distance information can be used to select one of the communication paths for implementation of a management policy.

It is possible for one or both of the end points to be in non-cloudified domains. In such instances, intermediate domains that are cloudified can still be represented as nodes for simplifying determination of the communication paths between the end points.

A special case is presented when the end point elements for a transaction are in the same domain, but the communication path is passed out of and then back into the domain containing the end points. In this case, a communication path may extend externally to one or more domain that can be cloudified. The cloudified external domains would be treated as transient domains. In an embodiment, the domain containing the end point elements is not cloudified, even if that domain satisfies a cloudification criteria.

Figure 2:
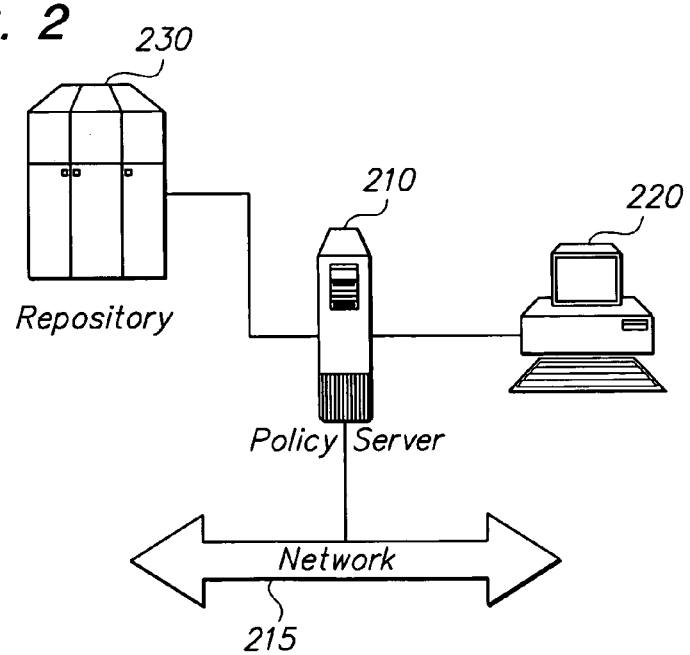
FIG. 2 illustrates components for reducing a network topology and implementing a management policy on a network.

FIG. 2 is a block diagram showing a system for reducing a network topology and for implementing a management policy, under an embodiment of the invention. The system includes a policy server 210 and a repository 230. The system may also include a terminal 220 to operate the policy server 210. The policy server 210 may access network 10 (FIG. 1) through a network channel 215.

In an embodiment, policy server 210 executes instructions to reduce a topology of network 10. The policy server 210 may also execute instructions for implementing a management policy on network 10. The policy server 210 identifies connectivity data structures for representing network 10 with cloudified domains. According to an embodiment, terminal 220 may signal to implement a desired management policy between selected end points of network 10. Using data structures (such as D and DI), instructions for implementing the management policy may be signaled from policy server 210 to network 10 over network channel 215. The instructions identify particular management components that will receive traffic between the end points. These management components will be configured according to instructions provided by policy server 210.

Figure 3:
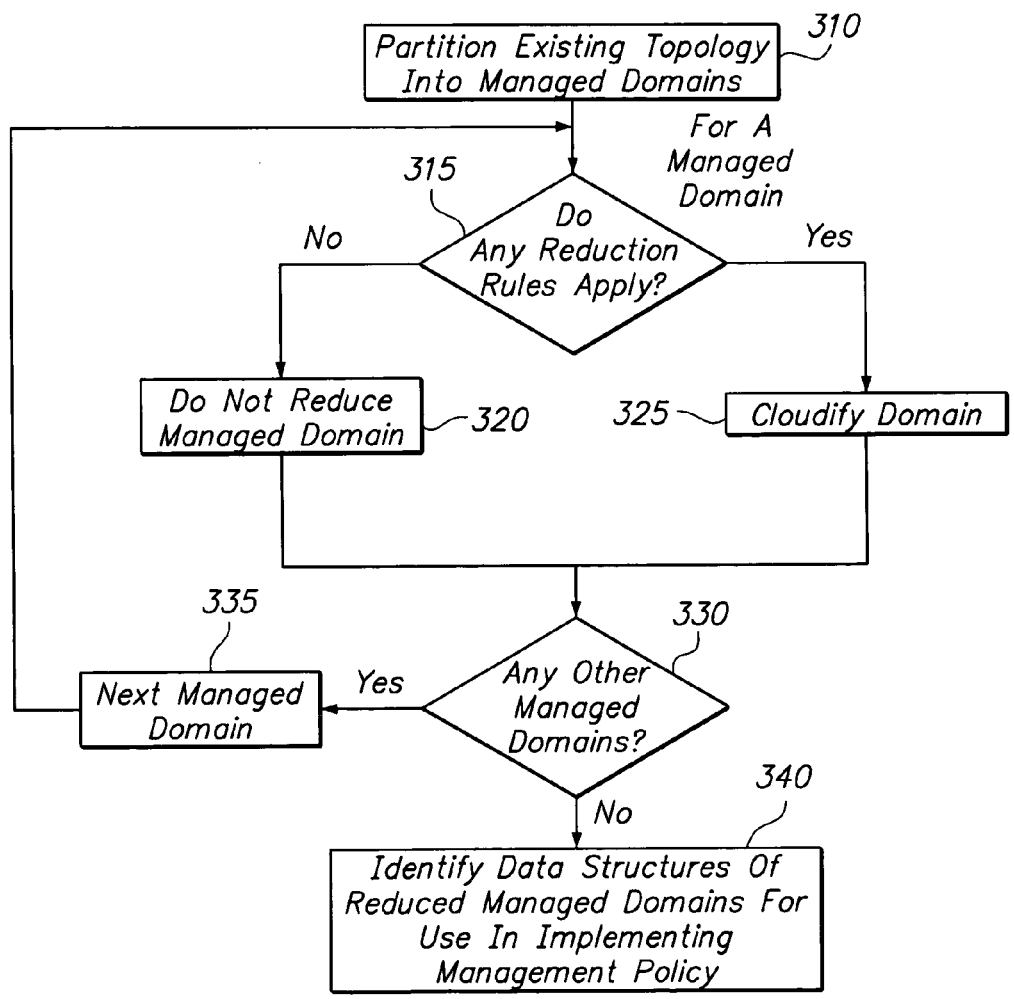
FIG. 3 is a flow chart of a method for reducing the topology of a network.
Figure 4:
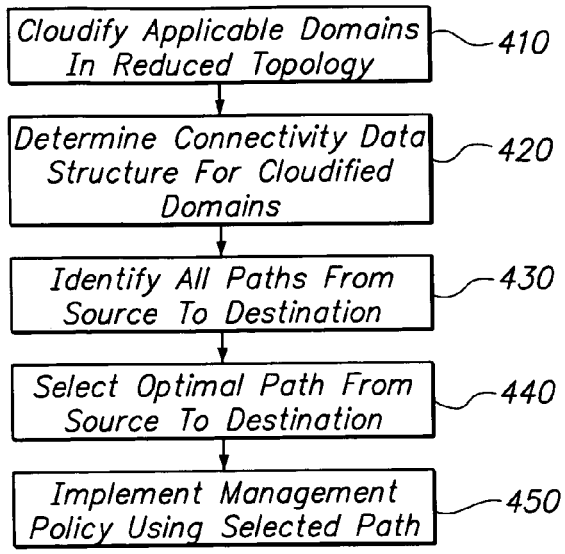
FIG. 4 is a flow chart of a method for implementing a management policy by reducing a network topology.
Figure 5:
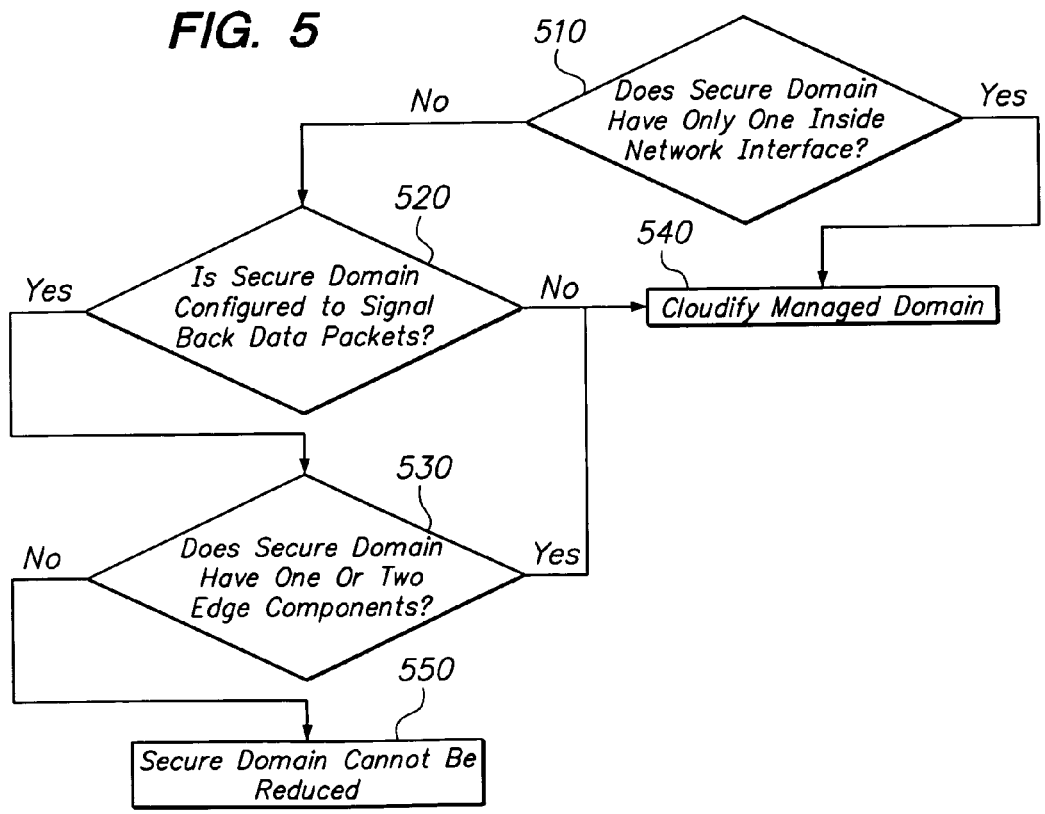
FIG. 5 is a flow chart for a method of determining whether managed domains can be cloudified for implementing a policy through firewall components.

FIG. 3, FIG. 4 and FIG. 5 are flow charts that describe methods to be performed, under an embodiment. For purpose of illustrating a simple example, the methods of FIG. 3, FIG. 4 and FIG. 5 are described herein in the context of FIG. 1 and elements of FIG. 1. However, the methods of FIG. 3, FIG. 4 and FIG. 5 are not limited to that specific context, but are broadly applicable for the purposes identified in this disclosure.

With reference to FIG. 3, a method is described for reducing the topology of a network. In step 310, an existing topology of the network is partitioned into managed domains. The partitioning is an abstract determination that does not physically alter network 10. Each managed domain comprises a plurality of connected network elements. Managed domains are separated from other managed domain by management components of a selected kind, as well as one or more interfaces between each component and internal network elements that comprise the managed domain. Managed domains are therefore a collection of interconnected network elements that to pass communications without passing those communications through a management component.

For each managed domain in step 315, a determination is made as to whether that managed domain satisfies any reduction rules. As will be discussed in detail, reduction rules determine whether internal connectivity of that domain can be ignored for communications that pass through or within that domain.

If the determination in step 315 is negative, that managed domain is not reduced in step 320. Else, that managed domain is cloudified in step 325. As noted by D and DI in the example provided above, the cloudified domain is represented as a set of data structures that identify network interfaces to edge components of that management domain and the distances between the interfaces. An internal network element of the cloudified domain is used for determining a communication path only if that network element is an end point for the communication path. Otherwise, the cloudified domain is treated as a node.

Following steps 320 and 325, a determination is made at step 330 as to whether another managed domain needs to be checked for reduction possibilities. If the determination is positive, then step 335 provides for another managed domain to be identified. Step 315 is then repeated for the other managed domain. If step 330 determines no other managed domains remain to be checked, then step 340 identifies reduced data structures for managed domains that satisfy one or more of the reduction rules in step 315. The data structures can then be used to implement the management policy.

FIG. 4 describes a method for implementing a management policy by reducing a network topology. In step 410, applicable domains in the network are identified as satisfying a reduction rule (or cloudification criteria). In step 420, connectivity data structures (see e.g. arrays D and DI) are determined for the cloudified domains.

In step 430, one or more communication paths between end point elements of a transaction are identified using the reduced topology with each domain replaced by a logical node. For example, network traffic may be analyzed between network elements in different cloudified domains with more cloudified domains in between. The communication paths are represented as extending between the end point elements and network interfaces to the managed components and between network interfaces to the managed components.

In step 440, one of the communication paths is selected. This step would use data structures D and DI to calculate the properties of all communication paths between the end point elements and to select the best path. The selection may be based on a property such as a network distance for each communication path. For example, the shortest communication path may be selected for the traffic.

In step 450, a management policy is implemented based on the selected path. In an embodiment, management components are configured to drive traffic along the selected communication path. Furthermore, management components that intercept communications along the selected communication path are configured to process the communications according to a corresponding management policy.

FIG. 5 describes a method for determining whether managed domains can be cloudified for implementing a policy through firewall components. The process details the application of reduction rules to a given domain of a network. A domain managed by a firewall component is referred to as a secure domain. An embodiment described with FIG. 5 assumes that a secure domain includes one or more edge firewalls as the managed components. The edge firewalls are configured to intercept communications to a corresponding secure domain. Each edge firewall has an inside interface to the corresponding secure domain. It is further assumed that an edge firewall could have more than one inside interface to a particular secure domain, and that multiple secure domains can be bounded by the same firewall.

For each secure domain in a network, step 510 makes a determination as to whether each edge firewall of that secure domain has only one inside interface. For example, with reference to FIG. 1, the firewalls can be implemented on managed components 12, 14, and 16. Each domain 52, 54, 56 and 58 includes only one interface separating the managed component from one of the domains. Excluding the singular first domain 52, third domain 56 and fourth domain 58 satisfy this criteria.

If the determination in step 510 is that the firewall includes multiple interfaces to that domain, then in step 520, a determination is made as to whether each inside interface of the firewall is configured to forward data packets from the corresponding secure domain to another domain, or to another network element outside of that secure domain. In an embodiment, step 520 determines whether the routing table of the firewall is configured to direct communications from the secure domain to another secure domain, or to another component or element external to that managed domain.

If the determination in step 520 is that communications from the domain may be redirected into that domain again, then step 530 makes another determination as to whether the particular domain has less than two edge firewalls. For example, if firewalls are implemented on managed components 12, 14 and 16 of network 10 (FIG. 1), second domain 54 has only two edge firewalls (second management component 14 and third management component 16), as does third domain 56 (first management component 12 and third management component 16).

If the determination in one of the steps 510, 520 or 530 is positive, then in step 540, the managed domain is cloudified. Else, step 550 assumes that domain cannot be reduced.

Figure 6:
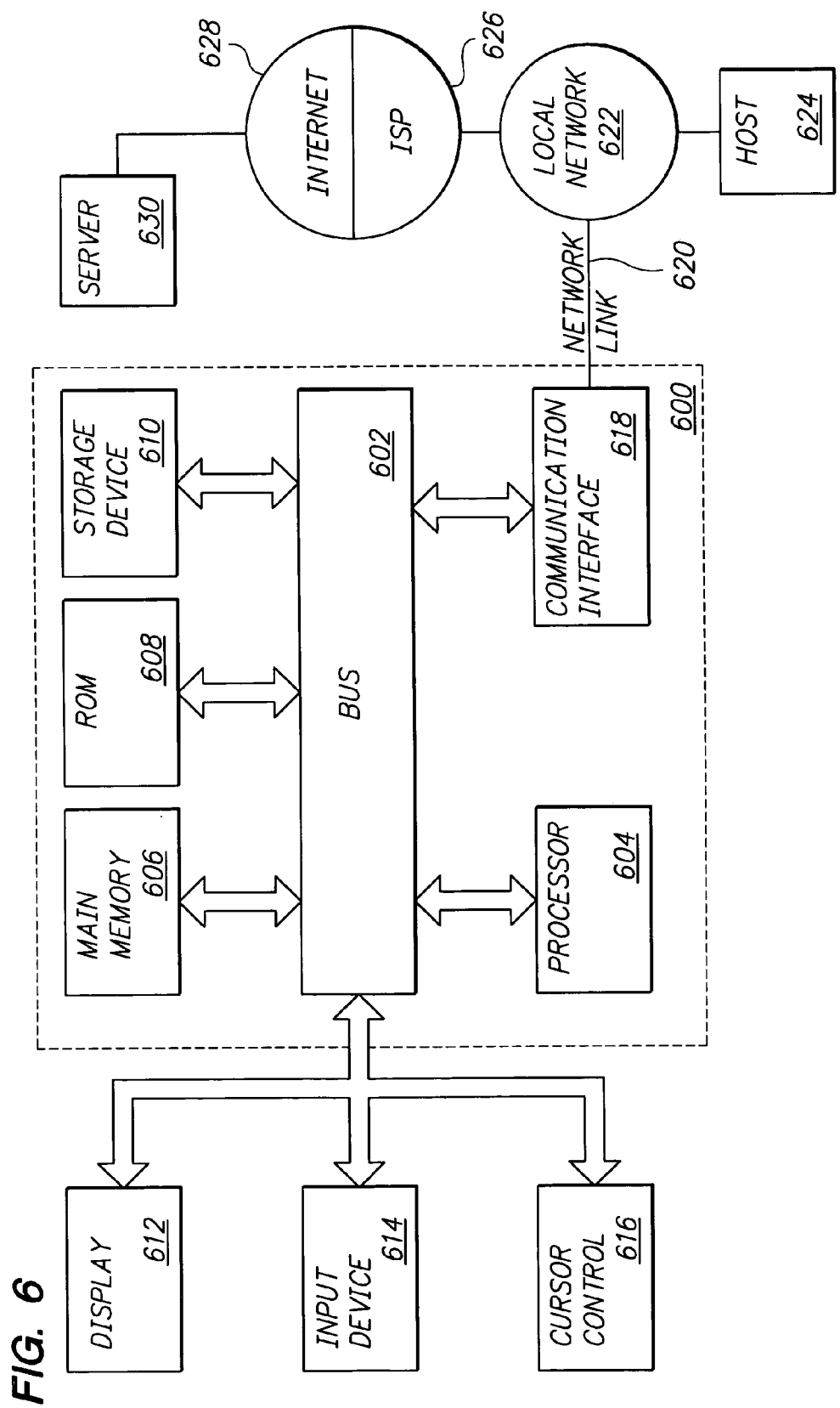
FIG. 6 is a block diagram that illustrates a computer system upon which an embodiment of the invention can be implemented.

FIG. 6 is a block diagram that illustrates a computer system 600 upon which an embodiment of the invention may be implemented. An embodiment provides computer system 600 to be incorporated with policy server 210 of FIG. 2. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing management policies using topology reduction. According to one embodiment, topology reduction on a network is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for topology reduction and/or policy management implementation, as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for implementing management policies on a network using topology reduction, the network including at least a first domain having a plurality of network elements, the method comprising:
   determining one or more management components in the network;
   determining two or more domains, wherein each (a) is bounded, in the network, by one or more of the management components and (b) does not contain any management components;
   determining a communication path passing through the first domain of the network that characterizes the first domain as a node, the communication path being characterized to pass communications without information loss;
   implementing a management policy for the network using the communication path;
   wherein determining the communication path passing through the first domain includes:
   identifying a second domain for a source element of a communication that uses the communication path, the second domain including a plurality of network elements;
   identifying a third domain for a destination element for the communication, the third domain including a plurality of network elements;
   characterizing a portion of the communication path within the second domain as a distance between the source element and an interface to the second domain, the portion of the communication path within the second domain being characterized without information loss; and
   characterizing a portion of the communication path within the third domain as a distance between the destination element and an interface to the third domain, the portion of the communication path within the third domain being characterized without information loss.

2. The method of claim 1, wherein determining the communication path passing through the first domain includes identifying a particular domain containing a particular source element and a particular destination element, a communication from the particular source element being signaled from the particular domain to the first domain before being signaled to the particular destination element.

3. The method of claim 1, wherein determining the communication path passing through the first domain includes:
   characterizing a portion of the communication path passing through the first domain as a distance between the second domain and the third domain.

4. The method of claim 1, wherein determining the two or more domains comprises:
   identifying a particular domain in the two or more domains having a cloudification characteristic, the particular domain having at least a first management component and a corresponding interface that forms an edge to the particular domain; and
   characterizing at least a first communication path for communications having an end element within the particular domain as being a distance between the corresponding interface to the particular domain and the end element, the first communication path passing communications without information loss.

5. The method of claim 4, further comprising storing the first communication path as a data structure defining the distance between the corresponding interface to the particular domain and the end element.

6. The method of claim 4, wherein the one or more management components comprise a plurality of management components, each management component in the plurality of management components having a corresponding interface and forming an edge for at least one domain.

7. The method of claim 4, wherein determining the two or more domains includes identifying a plurality of network elements that are interconnected between one or more interfaces of management components.

8. The method of claim 4, wherein determining the two or more domains includes identifying a plurality of firewall components, each firewall component having a corresponding interface and forming an edge for at least one domain.

9. The method of claim 4, wherein identifying the particular domain includes determining that the first management component has only one interface to the particular domain.

10. The method of claim 4, wherein identifying the particular domain includes determining that each management component for the particular domain has multiple interfaces to the particular domain, wherein each of the multiple interfaces are configured to forward communications received from a network element within the particular domain to another element or interface that is exterior to the particular domain.

11. The method of claim 4, wherein identifying the particular domain includes determining that the particular domain has only one or two corresponding interfaces that form edges for the particular domain.

12. The method of claim 1, wherein determining the two or more domains comprises:
    identifying a plurality of domains in the network, each of the plurality of domains having at least one network element;
    identifying a plurality of cloudified domains from the plurality of domains, each cloudified domain being bounded by a management component and at least one interface for the management component;
    identifying a particular source element and a particular destination element for a communication; and
    defining a plurality of communication paths passing within a first cloudified domain in the plurality of cloudified domains, each of the plurality of communication paths characterizing the first cloudified domain as a distance between an interface to the first cloudified domain and an end point element, the end point element characterizing at least one of the particular source element and the particular destination element, each of the plurality of communication paths passing communications within the first cloudified domain without information loss.

13. The method of claim 12, wherein identifying at least a first path in the plurality of communication paths includes characterizing the communication passing through a second cloudified domain in the plurality of domains as a node.

14. The method of claim 12, wherein identifying at least a first path in the plurality of communication paths includes:
    characterizing the communication passing through a second cloudified domain in the plurality of domains as a node; and
    characterizing the communication passing through a third cloudified domain in the plurality of domains as a second distance between an interface to the third cloudified domain and an end point element within the third cloudified domain.

15. The method of claim 1, wherein implementing the management policy includes implementing a firewall configuration on the communication path.

16. A computer-readable medium for implementing a management policy on a network that includes at least a first domain having a plurality of network elements, the computer readable medium carrying instructions for performing the steps of:
    determining one or more management components in the network;
    determining two or more domains, wherein each (a) is bounded, in the network, by one or more of the management components and (b) does not contain any management components;
    determining a communication path passing through the first domain of the network that characterizes the first domain as a node, the communication path being characterized to pass communications without information loss;
    implementing a management policy for the network using the communication path;
    wherein determining the communication path passing through the first domain includes:
    identifying a second domain for a source element of a communication that uses the communication path, the second domain including a plurality of network elements;
    identifying a third domain for a destination element for the communication, the third domain including a plurality of network elements;
    characterizing a portion of the communication path within the second domain as a distance between the source element and an interface to the second domain, the portion of the communication path within the second domain being characterized without information loss; and
    characterizing a portion of the communication path within the third domain as a distance between the destination element and an interface to the third domain, the portion of the communication path within the third domain being characterized without information loss.

17. An apparatus for implementing a management policy on a network that includes at least a first domain having a plurality of network elements, the apparatus comprising:
    means for determining one or more management components in the network;
    means for determining two or more domains, wherein each (a) is bounded, in the network, by one or more of the management components and (b) does not contain any management components;
    means for determining a communication path passing through the first domain of the network that characterizes the first domain as a node, the communication path being characterized to pass communications without information loss; and
    means for implementing a management policy for the network using the communication path;
    wherein the means for determining the communication path passing through the first domain includes:
    means for identifying a second domain for a source element of a communication that uses the communication path, the second domain including a plurality of network elements;

means for identifying a third domain for a destination element for the communication, the third domain including a plurality of network elements;

means for characterizing a portion of the communication path within the second domain as a distance between the source element and an interface to the second domain, the portion of the communication path within the second domain being characterized without information loss; and means for characterizing a portion of the communication path within the third domain as a distance between the destination element and an interface to the third domain, the portion of the communication path within the third domain being characterized without information loss.

* * * * *